United States Patent
Koyama et al.

(10) Patent No.: US 6,236,803 B1
(45) Date of Patent: *May 22, 2001

(54) REPRODUCING APPARATUS

(75) Inventors: Shinichi Koyama, Tokyo; Koji Takahashi, Kanagawa-ken, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,984

(22) Filed: May 9, 1997

Related U.S. Application Data

(63) Continuation of application No. 08/425,143, filed on Apr. 19, 1995, now abandoned.

(30) Foreign Application Priority Data

Apr. 28, 1994 (JP) .................................................. 6-091156

(51) Int. Cl.[7] .................................................. H04N 5/91
(52) U.S. Cl. ................. 386/68; 386/81; 386/82; 360/72.2; 360/73.04; 711/217
(58) Field of Search ................... 360/10.1, 10.3, 360/73.06, 73.04, 73.03, 73.07, 73.01, 73.05, 72.2; 358/310; 386/68, 81, 82; 711/217, 172, 4

(56) References Cited

U.S. PATENT DOCUMENTS

| | | | |
|---|---|---|---|
| 4,267,564 | * 5/1981 | Flores | 360/73.06 X |
| 4,478,376 | * 10/1984 | Sakaguchi et al. | 360/73.06 X |
| 4,539,603 | * 9/1985 | Takeuchi et al. | 360/69 |
| 4,774,699 | * 9/1988 | Giddings | 360/72.2 X |
| 4,800,450 | * 1/1989 | Rodal et al. | 360/74.1 X |
| 5,079,651 | * 1/1992 | Tsuchida et al. | 360/72.2 |
| 5,179,479 | * 1/1993 | Ahn | 360/72.2 X |
| 5,349,479 | * 9/1994 | Arimura et al. | 360/73.06 |
| 5,361,177 | * 11/1994 | Kozuki et al. | 360/72.2 X |
| 5,566,032 | * 10/1996 | Cleveland et al. | 360/72.2 |

* cited by examiner

Primary Examiner—Andrew L. Sniezek
(74) Attorney, Agent, or Firm—Robin, Blecker & Daley

(57) ABSTRACT

A reproducing apparatus which comprises a reproducing part having a first reproducing mode and a second reproducing mode different from the first reproducing mode and arranged to reproduce a signal recorded on a recording medium, a detection part for detecting a recording time of the signal recorded on the recording medium, and a control part for switching the reproducing part between the first reproducing mode and the second reproducing mode according to the recording time detected by the detection part.

8 Claims, 5 Drawing Sheets

FIG.2

| ADDRESS | SOLID-STATE MEMORY | | | |
|---|---|---|---|---|
| 1 | ID | VIDEO DATA | AUDIO DATA | PHOTOGRAPHING START ADDRESS |
| 2 | ID | VIDEO DATA | AUDIO DATA | |
| 3 | ID | VIDEO DATA | AUDIO DATA | |
| 4 | ID | VIDEO DATA | AUDIO DATA | |
| 5 | ID | VIDEO DATA | AUDIO DATA | |
| 6 | ID | VIDEO DATA | AUDIO DATA | |
| 7 | ID | VIDEO DATA | AUDIO DATA | |
| ⋮ | ⋮ | ⋮ | ⋮ | |
| n-1 | ID | VIDEO DATA | AUDIO DATA | |
| n | ID | VIDEO DATA | AUDIO DATA | PHOTOGRAPHING END ADDRESS |
| n+1 | UNRECORDED AREA | | | |

REPRODUCING APPARATUS

This is a continuation application under 37 CFR 1.62 of prior application Ser. No. 08/425,143, filed Apr. 19, 1995 abandoned.

BACKGROUND OF THE INVENTION

1. Field of the Invention

The present invention relates to a reproducing apparatus that reproduces signals recorded on a recording medium.

2. Description of the Related Art

It is a general practice to use a video tape recorder (VTR) using a ½-inch or 8-mm width magnetic tape in recording video signals and audio signals in the form of analog signals.

FIG. 5 is a block diagram showing the configuration of a conventional VTR. Referring to FIG. 5, a recording-review function of checking what is being video-taped will be explained. A video image picked up by a camera 51 and a sound picked up by a microphone 52 are processed for recording by a video signal processing circuit 53 and an audio signal processing circuit 54 and combined by an adder 55 into one signal which is then sent to a recording head 56. When a shooting start command is issued through an input key 57, a system control circuit 58 sends a record command to a servo circuit 59, which controls a capstan motor 60 and a drum motor 61 so as to rotate them at rotational frequencies for recording. The recording head 56 attached to a drum 62 records received signals representing a video image and sound onto a magnetic tape 63.

When a user stops shooting by pressing the input key 57, the system control circuit 58, in response to the command from the input key 57, sends a recording review command to the servo circuit 59. The servo circuit 59 stops the two motors 60, 61 to stop the recording operation and then reverses the capstan motor 60. At this time, the drum motor 61 is controlled to match the relative speed of a reproducing head 64 on the drum 62 so that signals recorded on the magnetic tape 63 can be reproduced. The signals reproduced by the reproducing head 64 are converted by a video signal processing circuit 65 into video signals and by an audio signal processing circuit 66 into audio signals. The video signals are displayed on a viewfinder 67 and the audio signal is sent to a headphone terminal 68.

The servo circuit 59 counts the pulses (CFG) that are output each time the capstan motor 60 rotates and rewinds the magnetic tape 63 to a position where video-taping is started. Then, the servo circuit 59 controls the capstan motor 60 and the drum motor 61 so as to rotate in the same direction and at the same speed as those during the recording, and performs reproduction to a position of the magnetic tape 63 where the video-taping is stopped. The user monitors the video image being reproduced on the viewfinder 67.

The above-mentioned VTR, however, has a drawback that it takes a rather long time to rewind the recorded magnetic tape in order to perform the recording-review and it takes a very long time to reproduce the tape in a normal reproducing mode.

SUMMARY OF THE INVENTION

An object of this invention is to provide a reproducing apparatus capable of reproducing recorded signals efficiently and reliably.

Another object of this invention is to provide a reproducing apparatus capable of reproducing recorded signals in a short time.

Still another object of this invention is to provide a reproducing apparatus capable of reproducing recorded signals in a fixed time.

To achieve the above object, a reproducing apparatus of one embodiment of this invention comprises reproducing means having a first reproducing mode and a second reproducing mode different from the first reproducing mode and for reproducing a signal recorded on a recording medium, detection means for detecting a recording time of the signal recorded on the recording medium, and control means for switching the reproducing means between the first reproducing mode and the second reproducing mode according to the recording time detected by the detect ion means. Because of this configuration, it is possible to perform tape reproduction in an appropriate reproducing mode according to the recording time of the signal recorded on a recording medium.

According to another embodiment of this invention, a reproducing apparatus comprises reproducing means having a first reproducing mode and a second reproducing mode different from the first reproducing mode and for reproducing a signal recorded on a recording medium, detection means for detecting an amount of information of the signal recorded on the recording medium, and control means for switching the reproducing means between the first reproducing mode and the second reproducing mode according to the amount of information detected by the detection means. Because of this configuration, it is possible to perform tape reproduction in an appropriate reproducing mode according to the amount of information of the signal recorded on a recording medium.

According to still another embodiment of this invention, a reproducing apparatus comprises reproducing means for reproducing a signal recorded on a recording medium, and control means for performing control in such a way as to make a reproducing time taken by the reproducing means constant irrespective of a recording time of the signal recorded on the recording medium. Because of this configuration, it is possible to always reproduce a signal recorded on a recording medium in a fixed time irrespective of the recording time of the signal.

According to a further embodiment of this invention, a reproducing apparatus comprises reproducing means for reproducing a signal recorded on a recording medium, and control means for performing control in such a way as to make a reproducing time taken by the reproducing means constant irrespective of an amount of information of the signal recorded on the recording medium. Because of this configuration, it is possible to always reproduce a signal recorded on a recording medium in a fixed time irrespective of the amount of information of the signal.

Other objectives and features of the present invention will become apparent from the following description-in this specification and the attached drawings.

BRIEF DESCRIPTION OF THE DRAWINGS

FIG. 2 is a diagram showing the structure of a solid-state memory used in the embodiment;

DETAILED DESCRIPTION OF THE PREFERRED EMBODIMENTS

One embodiment of this invention will be described, referring to the accompanying drawings.

Figure 1:
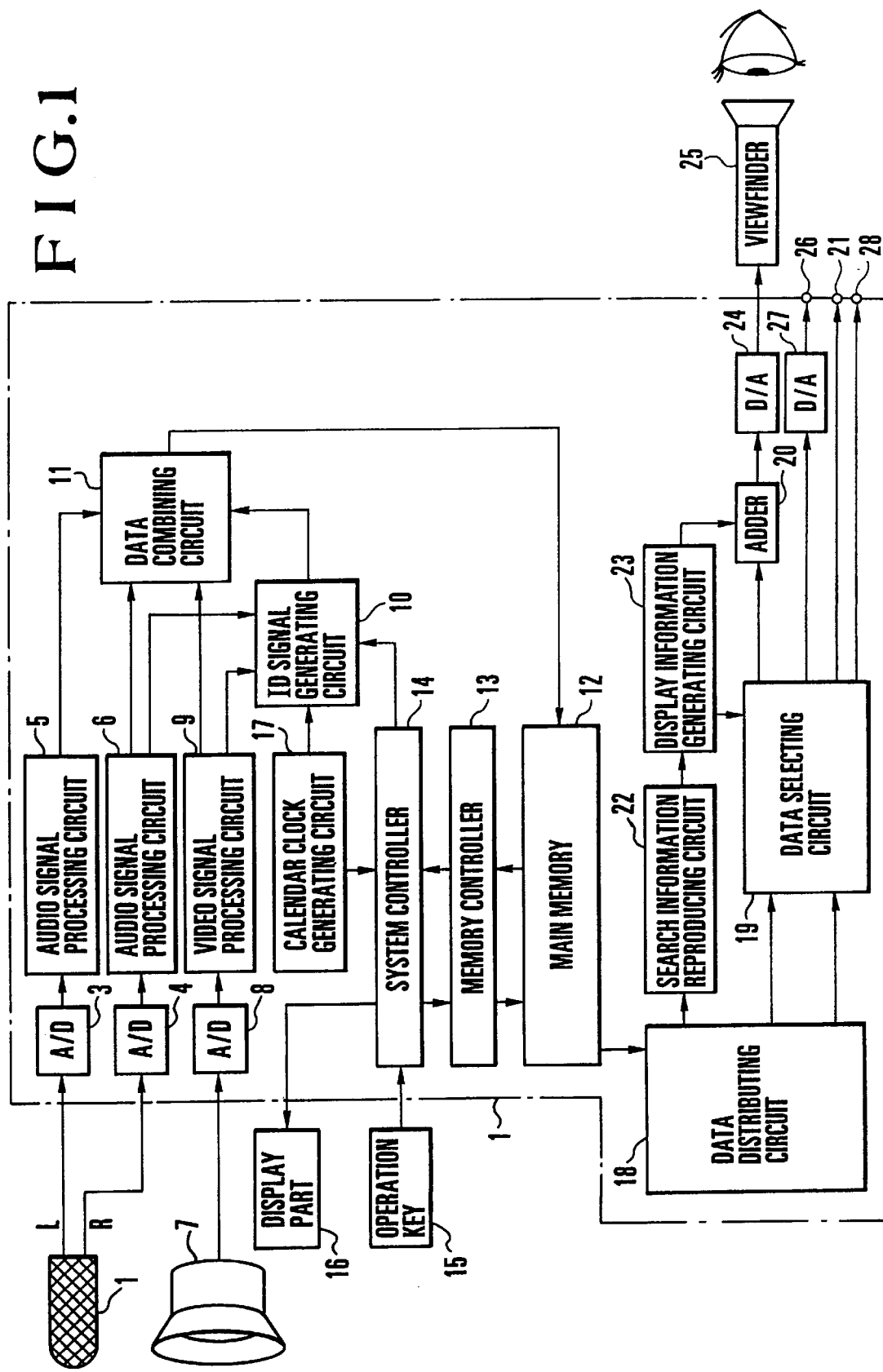
FIG. 1 is a block diagram showing the configuration of a video camera of one embodiment of this invention.

FIG. 1 is a configuration block diagram of a video camera of an embodiment of this invention. In FIG. 1, recording operation will be explained. Left (L) and right (R) channel stereophonic audio signals are fed from a stereo microphone 1 and converted into digital audio signals (audio data) by A/D converters 3, 4. The digital audio signals are subjected to various processings such as noise removal and limitation on dynamic range by audio signal processing circuits 5, 6.

A video signal fed from a camera 7 is converted into a digital video signal (video data) by an A/D converter 8 capable of processing faster than the A/D converters 3, 4 and the noise is removed by a video signal processing circuit 9.

Next, ID data generated by an ID signal generating circuit 10, the audio data and video data are combined by a data combining circuit 11 and stored in a main memory 12. The memory address, write and read of the main memory 12 are controlled by a memory controller 13. Further, the memory controller 13 is controlled by a system controller 14 to perform the overall control of the apparatus including the operation mode switching. The system controller 14, in response to a command to perform record/reproduction/ search entered through an operation key 15, controls the memory controller 13 and at the same time displays on a display part 16 information such as time codes representing the operation status and the recording/reproducing times. There are two kinds of time codes. One represents the elapsed time from the start of a recording medium or a video program, and the accumulated time of camera shooting. The other represents the date (year, month and day of the month) and the time (hour, minute and second) when recording or camera shooting was done and the time of frames. To generate the latter time code, the apparatus has a calendar clock generating circuit 17. Based on the information from the system controller 14, the ID signal generating circuit 10 generates an:ID signal representing time code, picture quality, audio mode selection. The data combining circuit 11 combines video data and audio data-into a data block for every ID signal.

Next, FIG. 2 shows an example of data storage in the main memory 12 formed of a solid-state memory. In FIG. 2, video data, audio data and ID data form one data block to which an address representing the location in the memory where they are stored is assigned. pne data block has a fixed amount of data. If, for example, one data block is formed for one field of an NTSC signal in corformity with the CCIR recommendation 601 studio digital encoding standards, the one data block consists of 1.42848 Mbits of video data, 23.52 Kbits of audio data and 10 bits of ID data. That is, the address number is updated for every total of these bits, as shown in FIG. 2.

The main memory 12 stores video data and audio data according to this data processing. It is also possible to expand the main memory and to use an interchargeable memory such as IC cards.

When a command to stop the recording is issued by the operation key 15, the system controller 14 stops the recording in the main memory 12. In FIG. 2, the recording (shooting) starts from the top and stops at an address number n. After this, to automatically start the recording-review, the system controller 14 displays on the display part 16 a message to the effect that the recording-review is being performed, and causes the memory controller 13 to control the memory address and read/write operation to read information signals stored in the main memory 12 by the recording operation.

The memory controller 13 starts reading from the address number 1 of FIG. 2, the recording (shooting) start address, and then increases the address number one by one. The increment of the address number by one results in that all the information is reproduced, so that this reproduction requires the same length of time as that of the recording. To shorten the reproducing time, the address number is increased by two, thus performing a double-speed reproduction. For example, only data blocks having the address number 1, 3, 5 . . . , n are reproduced. Still faster reproduction can be realized by increasing the increment by which the address number is increased.

Figure 3:
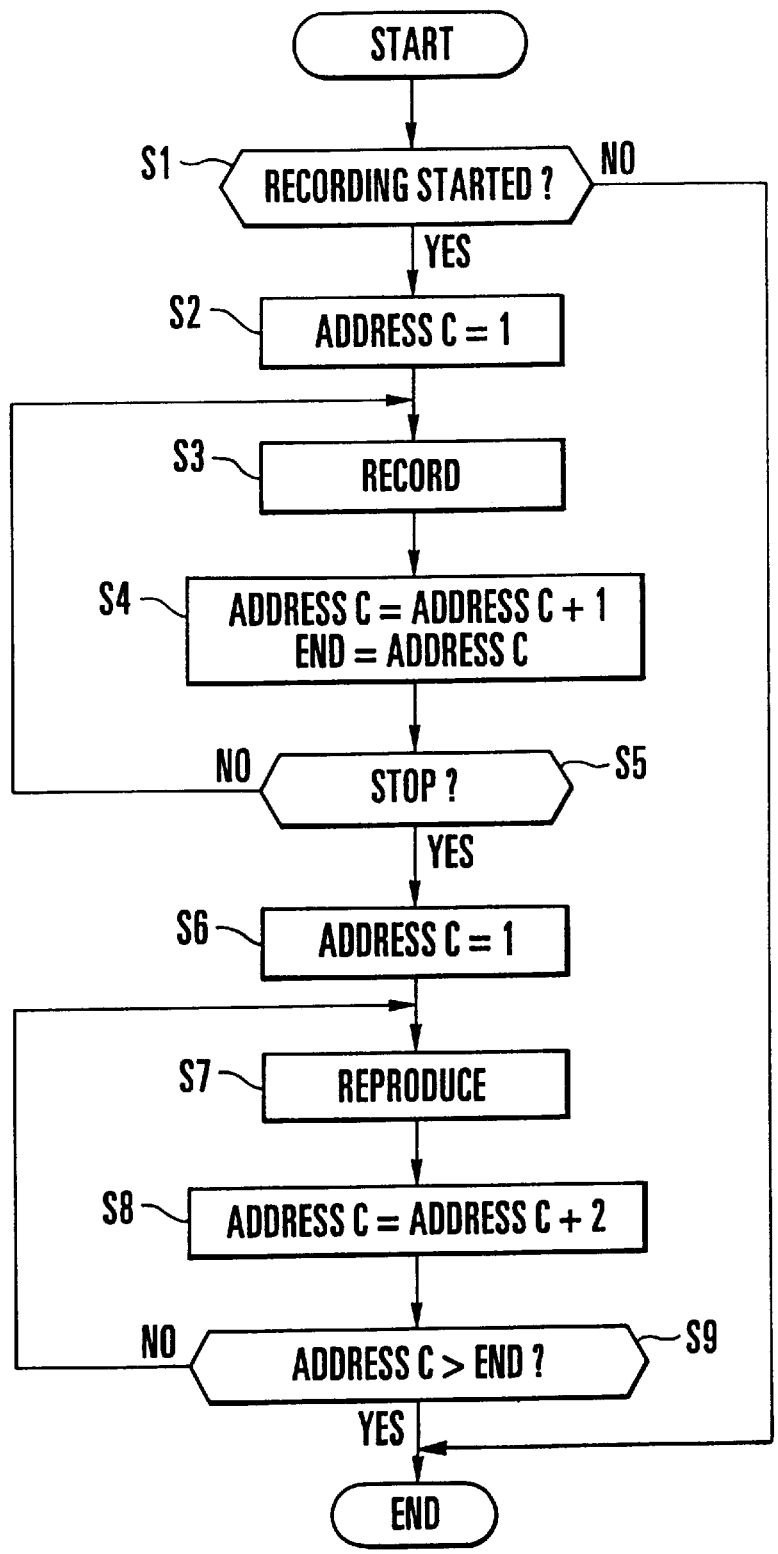
FIG. 3 is a flowchart of the invention.

The above-mentioned operation of the memory controller 13 is shown in the flow chart of FIG. 3. In FIG. 3, the recording is started at step S1, the operation moves to step S2 where the memory controller 13 writes in an address counter the memory address from which the data is recorded. In this example, the recording starts from the address number 1, the first address in the memory. Then, each time one data block is recorded at step S3, the address number in the address counter is increased by one at step S4. The value in the address counter, representing the end of shooting, is written in an END register. When the shooting is ended at step S5, the address counter is reset to the shooting start address number (in this case, "1") at step S6. At step S7, data block located at the address number indicated by the address counter is reproduced. Then, at step S8, the memory controller 13 increases the number in the address counter by two and reproduces the corresponding data block until the number in the address counter is larger than the value of the END register. At step S9, when the number in the address counter becomes larger than the value of the END register, the recording-review is ended.

Next, the reproduction will be explained referring to FIG. 1. The reproduced signal read-from the main memory 12 is in the form of serial data consisting of three kinds of data: ID data, video data and audio data, and is supplied to a data distributing circuit 18. Data fed to the data distributing circuit 18 is distributed as follows.

The video data is inputted into a data selecting circuit 19, which supplies an analog video signal for video image monitor to an adder 20 and at the same time sends the video data to a digital output terminal 21.

For the ID data information for every ID signal is detected by a search information reproducing circuit 22, display information for monitoring is generated by a display information generating circuit 23, the display information generated by the display information generating circuit 23 and the video information recovered by the data selecting circuit 19 are combined together by the adder 20, the combined signal is converted into an analog signal by a D/A converter 24, and this analog signal is displayed on a viewfinder 25.

For the audio data, the data selecting circuit 19 sends it to a D/A converter 27 for generating an audio signal for a headphone terminal 26 and also feeds the audio data to a digital output terminal 28.

Here, the video data and audio data are output from the data selecting circuit 19 in synchronism with the information from the display information generating circuit 23 to correct, by using the ID signal, the deviation between the video data and the audio data caused by the delay required to process the reproduced signal.

In this embodiment, recording-review starts automatically just after the shooting is ended, it is possible to start the recording-review operation only when the operator presses a recording-review key provided for this purpose in the operation key 15. Further, although this embodiment uses a solid-state memory for the recording medium, a magnetic tape may also be used instead. It is possible to perform reproduction in the reverse direction.

In this way, immediately after finishing the shooting, the operator can review the video image by fast-feed reproduction and thereby decide whether to start the shoot of the next sceen or reshoot the same scene that he or she just shot. When a solid-state memory is used, it is possible to produce, with a simple configuration, a video image of good quality with no noise even when the image is reproduced at high speed.

As mentioned above, the recording-review is performed in the fast-feed reproduction, if the speed of the fast-feed is constant, the reproduction finishes in a short time when the recording time is short. Conversely, when the recording time is long, the double-speed reproduction takes a great deal of time until it finishes.

Thus, the increment by which the address number is increased is made variable according to the shooting or recording time. That is, it is made small when the recording time is short and large when it is long. This control is carried out by the memory controller 13 for counting the address number and, according to the counter value, the value to be added to the address number is changed. The operation of the memory controller 13 is shown in the flowchart of FIG. 4 and will be explained referring to the FIG. 4.

Figure 4:
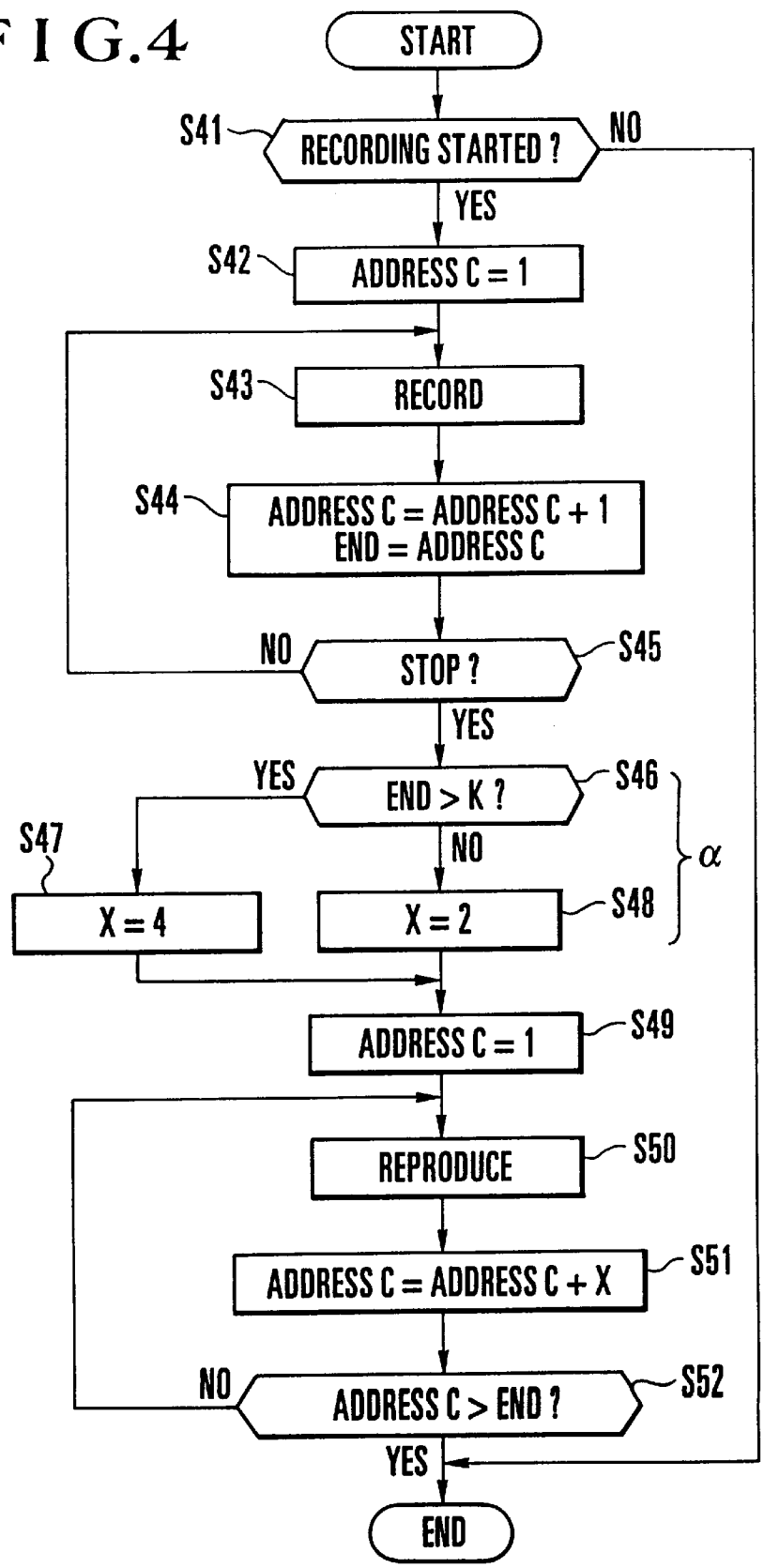
FIG. 4 is a flowchart of the invention.
Figure 5:
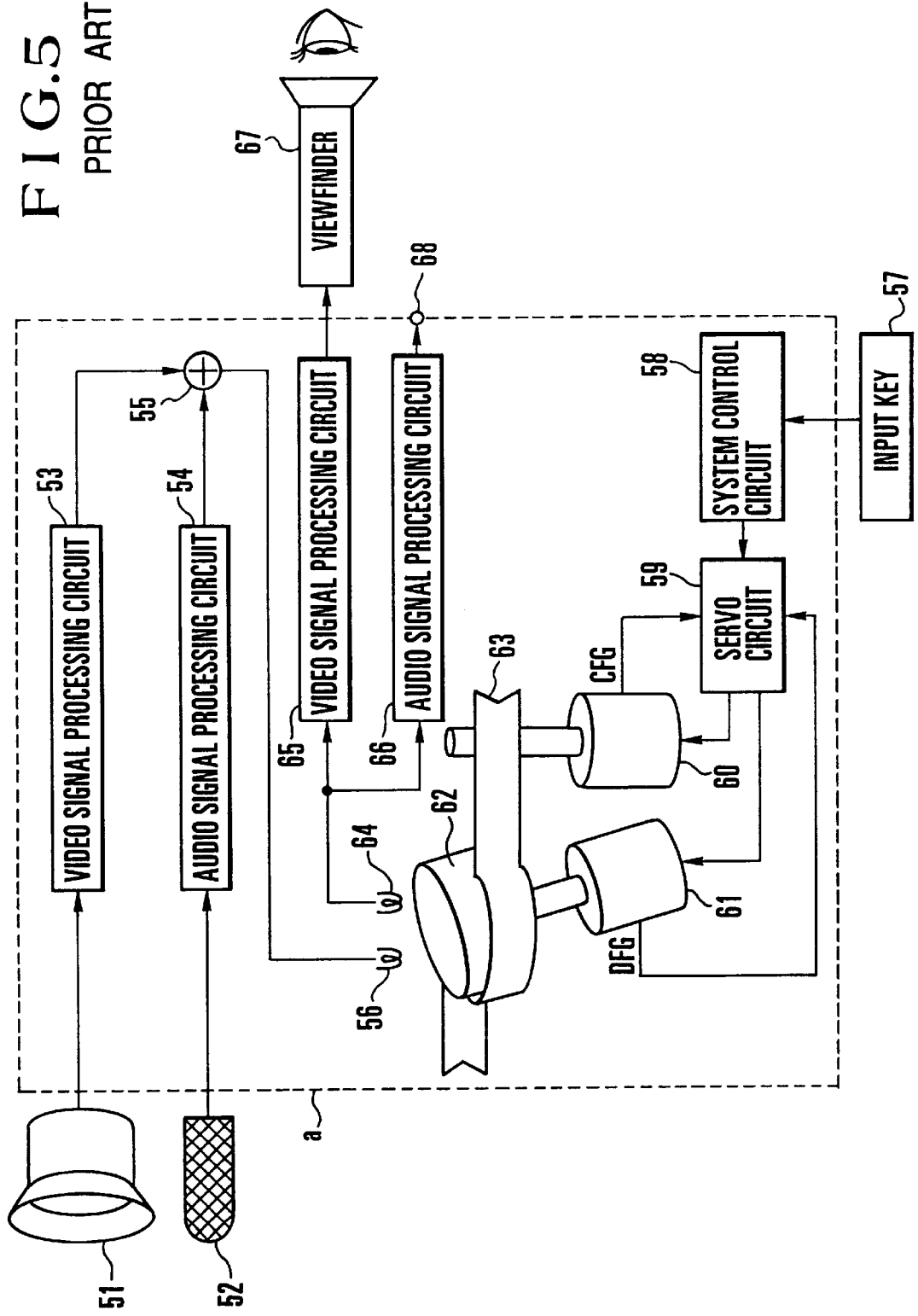
FIG. 5 is a block diagram showing the configuration of a conventional video camera.

In FIG. 4, recording is started at step S41, the operation of the memory controller 13 proceeds to step S42, where it writes in the address counter the memory address from which recording is started. In this example, recording is started from the address number 1, the first address of the memory, as shown in FIG. 2. Each time one data block is recorded at step S43, the address number in the address counter is increased by one at step S44. Then, in the END register the address counter value representing the end of recording is written.

When the shooting is ended at step S45 and the address counter value of the END register is greater than a fixed value K at step S46, the memory controller 13 goes to step S47 where it sets a value "4" to be added to the address counter X. If at step S46 the address counter value of the END register is smaller than the fixed value K, the memory controller 13 moves to step S48 where it sets the add value X to "2". Then at step S49, the memory controller 13 resets the address counter value to the recording start address number (in this example, "1") and at step S50 reproduces the data block specified by the address number of the address counter.

Then, the value of the address counter is increased by two or four at step S51 while the reproduction continues until the value of the address counter becomes larger than the END register value. Then, when the address counter becomes greater than the END register value at step S52, the recording-review is ended.

As described above, by changing the value to be added to the address counter X, i.e., the reproduction step according to the END register value representing the recording time, it is possible to change the speed of fast-feed reproduction according to the recording time. If the reproducing time is made constant irrespective of the recording time, it is possible to always perform the recording-review operation in a fixed time. Likewise, by monitoring the value of the address counter, it is possible to change the speed of fast-feed reproduction as the reproduction address approaches the recording end address.

While in this embodiment the video signal is taken as an example of the object of recording-review, signals other than the video signal may be subjected to the recording-review. That is, by changing the increment step of reading according to the recording time, the contents of the recorded signal can be reviewed in a short period of time.

What is claimed is:

1. A reproducing apparatus reproduces information recorded on a recording medium comprising:

(a) control means for changing an interval of addresses which are used to reproduce data blocks of the information based on an end address, the end address representing an address corresponding to a last data block of the information; and (b) reproducing means for reproducing a first data block of the information and data blocks of the information corresponding to addresses which are increased in accordance with the interval of addresses.

2. A reproducing apparatus according to claim 1, wherein a reproducing speed of the information recorded on the recording medium is different from a recording speed of the information.

3. A reproducing apparatus according to claim 1, wherein the information includes video data and audio data.

4. A reproducing apparatus according to claim 1, wherein the recording medium is a solid-state memory.

5. A method for reproducing information recorded on a recording medium, comprising the steps of:

(a) changing an interval of addresses which are used to reproduce data blocks of the information based on an end address, the end address representing an address ccoresppnding to a last data block of the information; and (b) reproducing a first data block of the information and data blocks of the information corresponding to addresses which are increased in accordance with the interval of addresses.

6. A method according to claim 5, wherein a reproducing speed of the information recorded on the recording medium is different from a recording speed of the information.

7. A method according to claim 5, wherein the information includes video data and audio data.

8. A method according to claim 5, wherein the recording medium is a solid-state memory.

* * * * *

UNITED STATES PATENT AND TRADEMARK OFFICE
CERTIFICATE OF CORRECTION

PATENT NO.    : 6,236,803 B1                              Page 1 of 1
DATED         : May 22, 2001
INVENTOR(S)   : Shinichi Koyama et al.

It is certified that error appears in the above-identified patent and that said Letters Patent is hereby corrected as shown below:

Column 3,
Line 35, delete "an:" and insert -- an --.
Line 37, delete "data-into" and insert -- data into --.
Line 43, delete "pne" and insert -- One --.

Column 4,
Line 33, delete "read-from" and insert -- read from --.

Column 6,
Line 42, delete "ccoresppnding" and insert -- corresponding --.

Signed and Sealed this

Thirtieth Day of April, 2002

Attest:

JAMES E. ROGAN
*Attesting Officer*   *Director of the United States Patent and Trademark Office*